United States Patent [19]
Powers

[11] 3,948,868
[45] Apr. 6, 1976

[54] HOMOGENEOUS STYRENE/ISOOLEFIN COPOLYMERS
[75] Inventor: Kenneth W. Powers, Berkeley Heights, N.J.
[73] Assignee: Exxon Research and Engineering Company, Linden, N.J.
[22] Filed: Feb. 17, 1971
[21] Appl. No.: 116,222

Related U.S. Application Data
[63] Continuation of Ser. No. 813,183, April 3, 1969, abandoned.

[52] U.S. Cl............ 260/80.7; 260/83.7; 260/88.2 C
[51] Int. Cl.²......................................... C08F 2/04
[58] Field of Search............ 260/80.7, 88.2 C, 83.7

[56] References Cited
UNITED STATES PATENTS

| 2,609,359 | 9/1952 | Sparks et al. | 260/79.5 |
|---|---|---|---|
| 2,615,004 | 10/1952 | Jaspar et al. | 260/33.6 |
| 2,676,950 | 4/1954 | Sparks et al. | 260/80.7 |
| 2,730,519 | 1/1956 | Leary | 260/88.1 |
| 3,455,890 | 7/1969 | Davidson | 260/85.3 |

OTHER PUBLICATIONS
Cationic Copolymerization of Isobutene, *Journal of Polymer Science*, Part A, 3, pp. 2455–2474 (1965).

*Primary Examiner*—Stanford M. Levine
*Attorney, Agent, or Firm*—Henry E. Naylor

[57] ABSTRACT

A process for preparing a homogeneous random polymer of two or more cationically polymerizable monomers having the general formula:

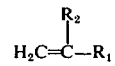

wherein $R_1$ is alkyl, alkenyl, phenyl, aralkyl or alkaryl, $R_2$ is H, alkenyl or alkyl and where $R_2$ is H, $R_1$ must be phenyl or alkylaryl, which comprises continuously reacting said monomers in a mixed solvent system comprising a polar organic solvent and a nonpolar, nonaromatic hydrocarbon solvent, said polymerization being carried out in a well-stirred reactor in the presence of a Friedel-Crafts catalyst. The preferred polymer is a homogeneous random styrene-isobutylene copolymer which is prepared by continuously reacting in solution about 10 to about 90 parts by weight of styrene with about 90 to about 10 parts by weight of isobutylene in a mixed solvent system comprising a polar organic solvent and a nonpolar nonaromatic hydrocarbon solvent.

11 Claims, 4 Drawing Figures

HOMOGENEOUS STYRENE/ISOOLEFIN COPOLYMERS

The instant application is a continuation of prior application Ser. No. 813,183, filed Apr. 3, 1969, now abandoned.

BACKGROUND OF THE INVENTION

Attempts have been made to produce copolymers of styrene and isobutylene. In general, the polymerization reactions have been carried out in the presence of Friedel-Crafts catalysts in solvents such as alkyl halides or saturated hydrocarbons such as propane, heptane, methylchloride, or ethylene dichloride.

The prior art products, for the most part, have not, in fact, been copolymers. They have for the large part been mixtures of homopolymers of styrene and isobutylene and contain some copolymers. This is substantiated by the fact that solutions of the so-called styrene-isobutylene copolymers in hexane or toluene show stratification or phase separation. These stratified layers indicate isotropic properties within each layer; furthermore, pads or films made with prior art copolymers tend to be translucent or opaque. A lack of transparency is a result of the fact that the various homopolymers, i.e., polystyrene and of isobutylene are not mutually soluble within one another and therefore form sites of precipitated material which result in opaqueness or translucency. Furthermore, a determination of the glass transition by differential thermal analysis demonstrates that the products have at least two broad glass transition temperatures. A homogeneous copolymer would have a single glass transition point whereas the mixed homopolymer blends show more than one glass transition temperature of a broad range.

Some improvement in the homogenity of the polymer produced is disclosed in U.S. Pat. Nos. 2,641,595 and 2,730,519, incorporated herein by reference. These improvements were effected by recognizing the importance of conducting the polymerization continuously under steady-state conditions in a well mixed reactor. However, while the copolymers of these patents were vastly more homogeneous than the prior art compositions, they still showed a fairly broad composition range because: (1) the importance of balancing reactivity ratios of the two monomers was not recognized; (2) the reactor mixing requirements to insure sufficient approach to an ideal back-mixed reactor were not recognized and specified; and (3) the necessity for maintaining polymer properly in solution was not recognized. Using the teachings of these patents, it was not possible to produce even reasonably good copolymers at low styrene content and it was not possible to operate at high conversion which is economically desirable because of the severe problems associated with recovery and recycle of unreacted styrene. Furthermore, even under the most ideal conditions for homogenity of high styrene content (>58%) and low conversion (<80%), the copolymers produced by the process of the aforementioned methods were far less homogeneous than those which can be produced by the present invention.

SUMMARY OF THE INVENTION

It has surprisingly been found that a random homogeneous polymer comprising two or more monomers having the general formula:

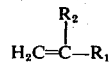

wherein $R_1$ is alkyl, alkenyl, phenyl, alkylaryl or aralkyl, $R_2$ is alkyl, alkenyl, or H and where $R_2$ is H, $R_1$ must be phenyl or alkylaryl, may be formed by polymerizing the monomer blend continuously in a well mixed reactor in the presence of a mixed solvent system comprising an organic polar solvent and a nonpolar nonaromatic hydrocarbon solvent. Preferably $R_1$ is $C_1$ to $C_{10}$ alkyl, $C_1$ to $C_{10}$ alkenyl or phenyl and $R_2$ is $C_1$ to $C_{10}$ alkyl or $C_1$ to $C_{10}$ alkenyl. Where $R_1$ is alkylaryl or aralkyl these radicals preferably are $C_7$ to $C_{15}$ radicals.

In particular, it has been found that styrene and isobutylene may be continuously copolymerized utilizing a well mixed reactor in the presence of about 20 to about 80% methylchloride and about 80 to about 20% of hexane in the presence of a Friedel-Crafts catalyst to form a random homogeneous copolymer.

The random homogeneous copolymers of this invention have properties which make them attractive in a number of applications. For example, relatively small amounts of styrene copolymerized with isobutylene markedly improve the processing properties by reducing nerve and shrinkage and yielding a polymer which is less elastic and more thermoplastic in nature. Hence, terpolymers of styrene, isobutylene, and isoprene containing small amounts of styrene (1 - 20 mole %) are essentially similar to butyl rubber in end use properties but have improved processing characteristics. The higher styrene copolymers (> 50 mole % styrene) are very hard plastic materials. They may be useful in various plastics applications as well as in paints and barrier coatings.

DETAILED DESCRIPTION

Figure 1:
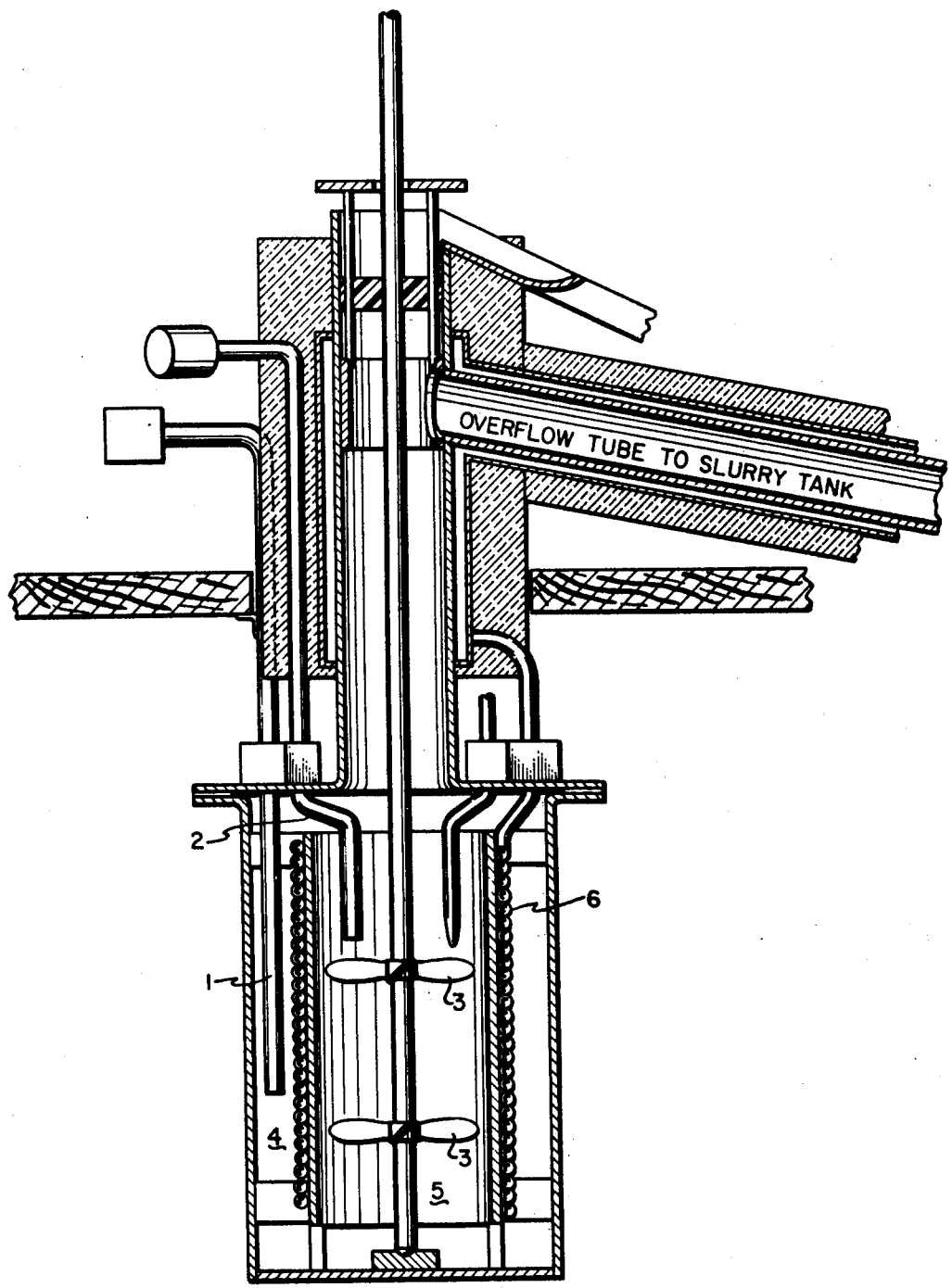
FIG. 1 shows a diagrammatic sketch of a well stirred reactor.

It has been found that in order to produce homogeneous random polymers of this invention, it is necessary that the reaction be carried out on a continuous basis or if carried out batchwise, it must be carried out with an azotropic feed ratio, that is with a ratio of the monomers in the feed which is equal to the ratio of the monomers in the polymer being prepared. Furthermore, in order to carry out the reaction batchwise, the reactivity ratios of the monomers must be essentially the same.

For the purposes of clarity, the invention will be described in terms of copolymerizing styrene and isobutylene, though any two or more monomers having the general formula:

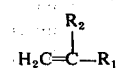

may be copolymerized. It is essential that at least one of $R_1$ or $R_2$ be an electron releasing group. Preferably, $R_2$ is alkyl, alkenyl, phenyl, alkylaryl or aralkyl; $R_1$ may be alkyl, alkenyl, or H, but where $R_1$ is H, $R_2$ must be phenyl or alkylated phenyl. There is no limitation on the length of the alkyl chain; however, to avoid stearic hindrance, the alkyl radical should not be branched within two carbon atoms of the double bond. Throughout the specification and claims, the term "isoolefinic compound" shall mean any cationically polymerizable monomer fitting the aforementioned description. The compounds are those wherein $R_1$ is $C_1$–$C_4$ alkyl, $C_1$–$C_4$ alkenyl or phenyl and $R_2$ is H or methyl.

Illustrative of the isoolefinic compounds of this invention are isobutylene, styrene, alpha-methyl styrene, 2-methyl-1-butene, 1-methylpentene-1, 2-ethylbutene-1, 2-methyl-1,3-butadiene, tolyl ethylene (P), 1,1-methylbenzyl ethylene, fulvenes, and beta-pinene. Methyl cyclopentadiene may also be polymerized in the practice of this invention.

In order to achieve reactivity ratios for styrene and isobutylene which are essentially equal to one another, it is necessary that the reaction be carried out in a mixed solvent system; the mixed solvent system comprises at least one non-aromatic polar organic solvent and at least one nonaromatic nonpolar hydrocarbon solvent.

The term "polar solvent" refers to those solvents which have a solubility parameter greater than 8; more preferably greater than 9; most preferably greater than 10. Illustrative of such nonaromatic polar organic solvents are methylchloride, ethylchloride, methylene chloride, carbon disulfide, ethyl bromide, methyl bromide, and chloroform.

The nonaromatic nonpolar hydrocarbon solvent is preferably a $C_5$ to $C_{10}$ hydrocarbon. The term "nonaromatic nonpolar hydrocarbon solvents" as used in the specification and claims means solvents which have a solubility parameter less than 7; more preferably about 4 to 6½; most preferably about 5 to 6. Illustrative of such hydrocarbon solvents are pentane, hexane, heptane, 2-methyl pentane, 2,2,3-trimethyl pentane, 2,3,5-trimethyl hexane, 3,3-dimethyl hexane, 2,3-dimethyl butane and methyl cyclopentane.

In order to successfully carry out the process of this invention, it is essential that the process be carried out in solution, i.e. in the liquid phase. Therefore, the mixed solvent system must be such that the copolymer formed is soluble therein. Hence, the mixed solvent system must contain at least 20% by volume polar nonaromatic organic solvent and at least 20% by volume of the nonpolar nonaromatic hydrocarbon solvent. The solvent comprises preferably about 20 to about 80% by volume of the nonpolar solvent and about 80% to about 20% by volume of the polar solvent. More preferably, the solvent mixture comprises about 25 to about 75% by weight of polar solvent and about 25 to about 75% by weight of polar hydrocarbon solvent. Most preferably, the solvent mixture comprises about 33 to about 66% by weight of polar solvent, the remainder being nonpolar solvent.

The reactivity ratios for the styrene and isobutylene may be measured by any of the known techniques for measuring reactivity ratio. This reactivity ratio will vary depending upon the catalyst used and on the particular solvents selected and the ratio of the polar solvents to nonpolar solvents. One skilled in the art may readily determine the reactivity ratios for styrene and isobutylene for the particular solvent system he chooses to use at various polar/nonpolar solvent ratios. In the practice of this invention, the ratio of the reactivity ratio of styrene to the reactivity ratio of isobutylene should be about 0.4 to about 3.0, preferably, this ratio is about 0.6 to about 1.6, more preferably, about 0.75 to about 1.25. Ideally, the ratio of reactivity ratios is 1.

In order to properly carry out the process for preparing the homogeneous copolymers of this invention, it is essential that the reaction be carried out in a well stirred back mixed reactor. In any continuous reactor, a steady state condition is set up. In order that a well stirred condition be defined, ideally, the incoming stream is completely mixed with the steady state system of the reactor at a rate which is more rapid than the reaction rate of the monomers.

The characteristics of an ideal well-stirred tank reactor (or total backmix reactor) are well known in the literature; see for example, *Chemical Reaction Engineering*, Octave Levenspiel, page 102, John Wiley and Sons (1962), incorporated herein by reference.

Illustrative of a reactor which is adequate for the purposes of this invention is shown in FIG. 1. As shown in this diagrammatic sketch, monomers diluent, and/or cocatalyst (if used) are injected into the reactor through any one, or all, of the three feed lines provided, 1. Catalyst solution is injected separately through the catalyst inlet line provided, 2. Feed and catalyst must always be injected separately, but the exact injection point into the reactor can be varied. Nevertheless, it is generally preferable to inject catalyst near the propellors, 3, in the draft tube, 5, where the highest intensity mixing occurs. In the diagram, catalyst is shown entering the draft tube, 5, above the propellers, 3, and feed is shown entering the annulus, 4. However, in many cases, it is actually preferable to inject both feed and catalyst into the same area of the reactor and into the zone of highest turbulence directly below the impellors, 3. Reactor circulation is provided by propellor-type agitators, 3. Reactors contents are pumped down through the draft tube, 5, by the propellers, 3, and circulate back up through the annulus, 4, where cooling is effected by the cooling coils, 6. In order to approach ideal mixing, the mixing energy provided must be at least 0.08 horsepower/gallon. Circulation rate in the reactor should be about 500 to 1000 times the total feed rate. These conditions result in a turn over rate of at least 20 times per minute for the entire reactor contents.

As used in the specification and claims, the term "well mixed reactor" means a well stirred tank reactor having a circulation rate of at least 400 times the total feed rate; preferably about 500 to 1000 times the total feed rate.

The copolymerization of styrene-isobutylene may be carried out in the presence of any suitable Friedel-Crafts catalyst. Illustrative of such catalysts are aluminum chloride, aluminum ethyl dichloride, aluminum bromide, boron trifluoride, titanium tetrachloride and isobutyl aluminum dichloride. Preferably, the ratio of monomer to catalyst is about 2000/1 to about 300/1, more preferably, 1800/1 to about 600/1; most preferably, 1500/1 to about 800/1.

It has been surprisingly found that depending on the catalyst selected for particular monomer to catalyst ratios, conversion rates of about 95 to 99% may be achieved in comparison to the prior art conversion rates of about 40 to 80%. For example, where the catalyst is aluminum chloride, the monomer to catalyst ratio on a weight basis is about 1000:1 to about 1500:1 and where the catalyst is aluminum ethyl dichloride, the monomer to catalyst ratio is about 600:1 to about 900:1 on a weight basis.

Polymerization reactions of this invention may be carried out at a temperature of about −30 to about −100°C. More preferably, the reaction is carried out at about −40 to about −97°C., most preferably, at about −50 to −96°C., e.g. −95°C.

Preferably, the reactions are carried out at atmospheric pressure. However, any pressure high enough to keep the reactants liquefied may be used.

Although the invention is described in terms of copolymerization of styrene and isobutylene, it is applicable to the production of homogeneous terpolymers such as styrene-isobutylene-isoprene terpolymers. These polymers are in essence styrene modified butyl rubbers.

The term "butyl rubber" as used in the specification and claims is intended to include copolymers made from a polymerization reactant mixture having therein about 70 to 99.5% by weight of an isoolefin which has about 4 to 7 carbon atoms and about 30 to 0.5% by weight of a conjugated multiolefin having about 4 to 14 carbon atoms. The resultant copolymer contains about 85 to 99.5% of combined isoolefin and 0.5 to 15% of combined multiolefin. The term butyl rubber is described in an article by R. M. Thomas et al. in *Industrial Engineering and Chemistry*, vol. 32, pp. 1283 et seq., October, 1940.

The butyl rubber has a viscosity average molecular weight between about 100,000 and about 800,000; preferably about 250,000 to about 600,000 and a Wijs Iodine number of about 0.5 to about 50, preferably about 1 to about 20. The preparation of butyl rubber is described in U.S. Pat. No. 2,356,128, which is incorporated herein by reference.

The term butyl rubber is also intended to include "low molecular weight butyl rubbers" having viscosity average molecular weights of about 5,000 to 80,000, more preferably about 10,000 to about 40,000. These products can be formed using the conventional butyl rubber process operating at elevated temperatures, i.e. above 50°C.

The term "styrene modified butyl rubber" is used in the specification and claims means random homogeneous terpolymers of styrene, isobutylene and isoprene or other conjugated multiolefins suitable for use in preparing butyl rubber. The feed mixture is the same as that for butyl rubber, except that a portion of the isoolefin is replaced by styrene monomer. The polymer may contain about 1 to about 20 mole % styrene; more preferably about 1 to about 10 mole %; most preferably about 2 to about 8 mole %, e.g. 5 mole %. The feed stream can be comprised of about 30 to about 0.5 weight % conjugated multiolefin and about 0.5 to about 30 wt. % styrene, the remainder being isoolefin, e.g. isobutylene.

The styrene-containing butyls possess better UV resistance than conventional butyls and are far more resistant to surface softening and tack development during sunlight exposure--they are of interest in areas where UV resistance is desired such as sidewalls, coated fabrics, etc. The styrene-containing butyls also possess much higher damping characteristics than regular butyls and are of interest in vibration isolation applications. Of special significance is the fact that the presence of styrene does not adversely affect the low permeability characteristics of butyl.

The styrene-isobutylene copolymers of this invention may contain about 1 to about 90 mole % styrene. The low styrene content, i.e. about 1 to about 25 mole %, copolymers are rubbery polymers.

Intermediate amounts of styrene (25 to 40 mole %) copolymerized with isobutylene yield plastomeric materials. These polymers possess appreciable strength in the unvulcanized state along with excellent elongation and good elastic memory. These intermediate styrene copolymers are very tough materials and may be excellent polymers for plastics blending to impart impact resistance, although some of the lower styrene copolymers may also be desirable for plastics blending. These intermediate styrene-copolymers possess outstanding resistance to UV light, possess low water absorption, have good adhesion characteristics, and yield tough flexible films. With moderate filler loadings there films are reasonably hard and slippery but still tough. They are excellent materials for exterior coatings such as exterior roof coatings and paints for soft dimensionally unstable substrates such as wood. Latexes of these intermediate copolymers appear to be very attractive possibilities. The excellent barrier properties of these copolymers also suggest utility in a host of functional coatings, especially in latex form.

The higher styrene copolymers (> 50 mole % styrene) are very hard plastic materials. They may be useful in various plastics applications as well as in paints for harder substrates and barrier coatings for harder materials.

Although the invention has been described in terms of the copolymerization of styrene and isobutylene, it is obvious to those skilled in the art that any cationically polymerizable isoolefinic compound or mixtures thereof may be copolymerized with styrene by the process of this invention.

It is only necessary to determine the reactivity ratio of the isoolefinic compound mixed solvent in blends in the manner taught by this disclosure to apply the process of this invention to isoolefin other than isobutylene. The solvent composition used for polymerization should be such that the ratio of the reactivity ratio of styrene to the reactivity ratio of isoolefinic compound is about 0.4 to about 3.0; preferably about 0.6 to about 1.6; more preferably about 0.75 to about 1.25. Ideally, the ratio of reactivity ratios is 1.

The isoolefinic compound-styrene feed may vary in concentration from about a blend of 10 wt. % isoolefinic compound to about 90 wt. % isoolefinic compound, the remainder being styrene.

If desired, terpolymers may be prepared using the isoolefins of this invention and styrene terpolymerized with a conjugated multiolefin of 4 to 14 carbon atoms. Preferably, the monomer feed stream contains less than 30 wt. % multiolefin; more preferably less than 15 wt. %; most preferably about 0.5 to about 10 wt. %, e.g. about 0.8 to about 3 wt. %.

The isoolefin-styrene monomer blend preferably comprises about 70 to about 99.5 wt. % of the total monomer feedstream. The terpolymer feedstream can contain about 1 to about 20 wt. % styrene; preferably about 5 to 15 wt. %.

The term "substantially homogeneous random copolymer" as used in the specification and claims means a copolymer substantially free of homopolymer.

The advantages of this invention may be more readily appreciated by reference to the following examples.

EXAMPLE 1

Styrene and isobutylene were polymerized in the presence of aluminum chloride as a catalyst in a mixed solvent system comprising methylchloride and hexane. The reactivity ratios for each of the monomers and the azotropic composition (mole % styrene) was determined.

In order to determine the reactivity ratios of styrene and isobutylene, polymerizations were carried out in a stirred and cooled 2-liter resin flask in a dry box under dry nitrogen atmosphere. Cooling was provided by immersing the resin flask in an isopentane bath cooled by feeding liquid nitrogen through coils in the bath. Temperature was controlled to within +1°C. by controlling the liquid nitrogen rate via a thermocouple-activated solenoid controller. All reactants were carefully purified and dried prior to use. Polymerizations were carried out by slowly adding the catalyst solution to the reaction mixture from a burette. The reaction mixture consisted of 3.3 moles of monomers per liter in a methylchloride-hexane solvent blend.

In order to insure the low conversions (<5%) necessary for determination of reactivity ratios, small aliquots were taken during the polymerization and precipitated with cold methanol to determine conversion. When about 5% conversion had been achieved, the reaction was quenched by adding 100 mls of cold methanol.

The polymer was precipitated by pouring the mixture into 1000 ml. of isopropanol. The precipitated polymer was collected, washed, and dried at 60°C. in a vacuum oven prior to analyses. The liquors remaining after removal of the polymer were evaporated to dryness to insure no appreciable amount of low molecular weight polymer was present.

Composition of the dried copolymer was determined by NMR-spectroscopy. Reactivity ratios were determined by applying the linear method of Fineman and Ross to the data from four polymerizations at feed compositions of 20, 40, 60 and 80 mole % styrene; see M. Fineman and S. D. Ross, J. Poly. Sci., V. 2 259 (1950), incorporated herein by reference.

TABLE I

REACTIVITY RATIOS AND AZEOTROPIC COMPOSITIONS FOR COPOLYMERIZATIONS OF STYRENE AND ISOBUTYLENE IN VARIOUS SOLVENT SYSTEMS. $AlCl_3/CH_2Cl_2$ AS CATALYST

| Solvent Vol. % | | React. Ratio for | | Azeotropic Composition, |
|---|---|---|---|---|
| MeCl | Hex. | Styrene | Isobutene | Mole % Styrene |
| 100 | | 1.11 | 2.58 | 89 |
| 75 | 25 | 1.80 | 7.14 | 88.4 |
| 50 | 50 | 1.50 | 2.10 | 68.7 |
| 25 | 75 | 1.75 | 2.10 | 59.3 |
| | 100 | 1.98 | 0.65 | None |
| Toluene | | 1.40 | 1.65 | 62.0 |

Table I shows the results of these experiments. It is noted that where the solvent is methylchloride, the reactivity ratio for styrene is 1.11 as compared to 2.58 for isobutylene. By contrast, where the solvent mixture comprises 75 volume % methylchloride, the styrene reactivity ratio is 1.80 as compared to 7.14 for isobutylene. Where the methylchloride content is 25 volume %, the reactivity ratios are 1.75 for styrene and 2.10 for isobutylene. Where the solvent is 100% hexane, the reactivity ratio for styrene is 1.98 and for isobutylene is 0.65. It is therefore evident that the reactivity ratios of the monomers are effected not only by the selection of the solvents, but the ratio of the mixture of solvent components.

Figure 2:
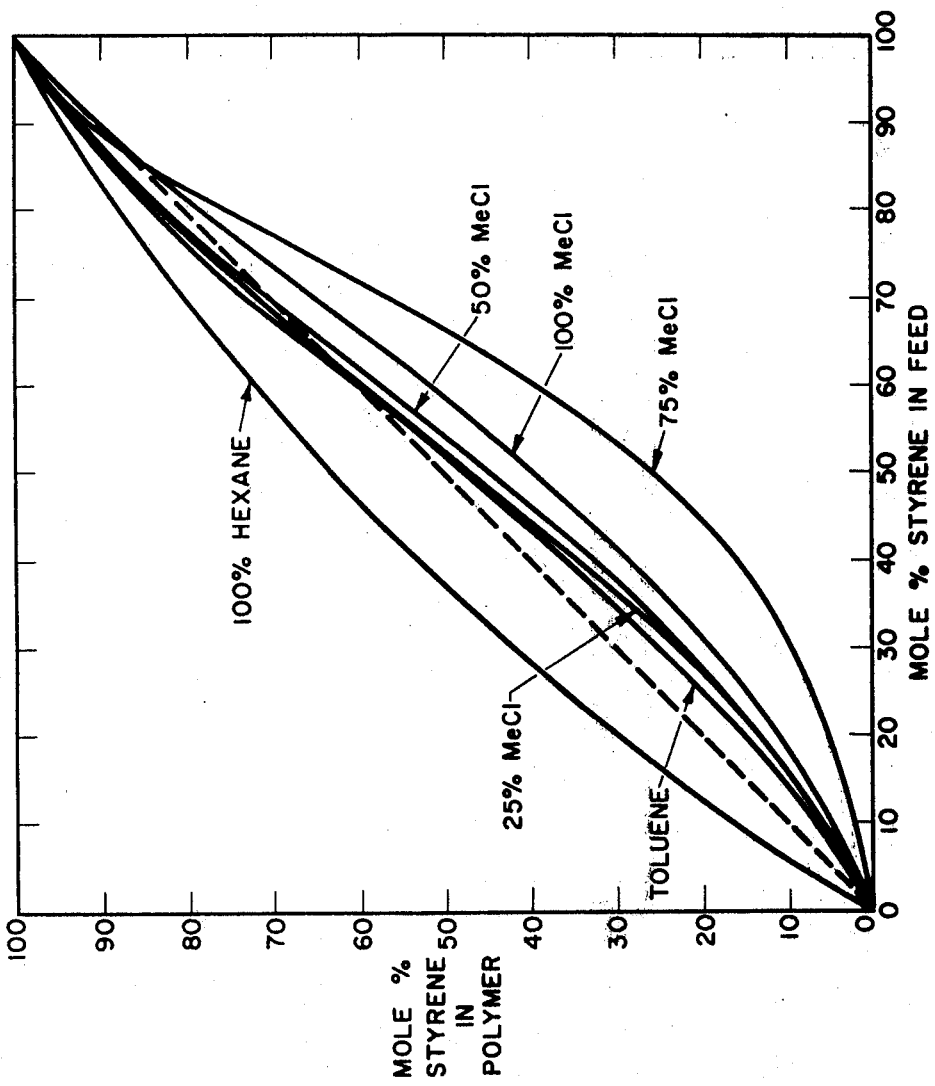
FIG. 2 is a copolymerization phase diagram for styrene-isobutylene copolymers in various solvents using aluminum chloride as the catalyst.

In carrying out these experiments, the feed ratios of mole % styrene to isobutylene were determined and phase diagrams were prepared which show the mole % styrene in the feed as compared to the mole % styrene in the polymer. FIG. 2 is a phase diagram for the copolymerization of styrene-isobutylene copolymers in various solvent mixtures using aluminum chloride as a catalyst. The azeotropic mixtures are those mixtures wherein the % styrene in the feed is identical to the mole % styrene in the polymer.

It is evident that is a reaction is carried out on a batchwise basis, at some point away from the azeotrope, that one of the components, i.e. styrene or isobutylene, will be more rapidly used up depending upon its content in the feed. For example, where the hexane-methylchloride solvent contains 75% methylchloride and the mole % styrene in the feed is 30%, the mole % styrene in the polymer is approximately 8%. Hence, isobutylene is used up at a faster rate than styrene and the feed becomes styrene rich. Due to the differences in reactivity rate, this results in the formation of styrene homopolymers, rather than continual formation of a homogeneous copolymer. Therefore, it is evident that if a copolymer is to be formed at some other feed ratio other than at the azeotrope, it must be prepared continuously in a well mixed reactor and not in a batch process.

EXAMPLE 2

The experiments of Example 1 were repeated using aluminum ethyl dichloride as the catalyst. The reactivity ratios for various methylchloride/hexane mixtures are shown in Table II.

TABLE II

REACTIVITY RATIOS AND AZEOTROPIC COMPOSITIONS FOR COPOLYMERIZATIONS OF STYRENE AND ISOBUTYLENE IN VARIOUS SOLVENT SYSTEMS. $EtAlCl_2$ AS CATALYST

| Solvent Vol. % | | React. Ratio for | | Azeotropic Composition, |
|---|---|---|---|---|
| MeCl | Hex. | Styrene | Isobutene | Mole % Styrene |
| 100 | | 1.92 | 5.15 | 82 |
| 75 | 25 | 4.81 | 11.82 | 74 |
| 50 | 50 | 2.80 | 5.88 | 73 |
| 25 | 75 | 4.93 | 4.25 | 45 |
| | 100 | no polymer at 20% styrene in feed | | |

Figure 3:
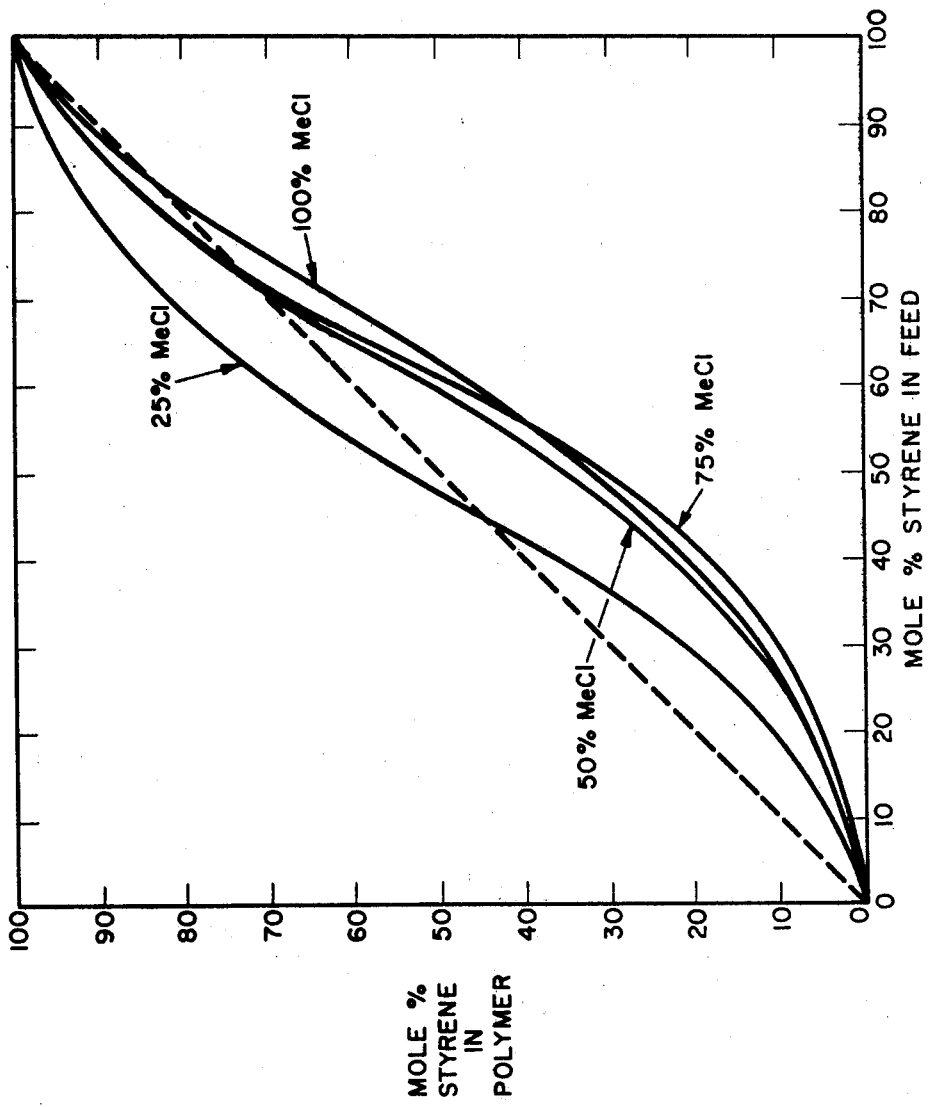
FIG. 3 is a copolymerization phase diagram for styrene-isobutylene copolymers in various solvents using aluminum ethyl dichloride as the catalyst.

It is noted again that the reactivity ratios, though different than those where aluminum trichloride is the catalyst, vary with solvent composition. Similarly, the azeotropic compositions vary as the catalyst is changed. FIG. 3 shows the phase diagram for the copolymerization of styrene and isobutylene in various solvents using aluminum ethyl dichloride as the catalyst.

EXAMPLE 3

The following four feedstreams were prepared and fed into a well-mixed tank-type reactor at −140°F.

Feedstream No. 1 — 23.85% styrene in methyl chloride

Feedstream No. 2 — 0.19 g. $AlCl_3$ per 100 g. methylchloride

Feedstream No. 3 — isobutylene

Feedstream No. 4 — hexane

Feedstreams No. 1, 3 and 4 were prechilled to −140°F., blended and then fed into the annulus of a well-mixed tank containing a center draft tube and cooling coil. Feedstream No. 2 was chilled to −80°C. and then fed into the center of the draft tube. Feed rates were adjusted so that the following steady-state flows were maintained into the reactor.

| Material | Flow Rate g./min. | |
|---|---|---|
| Styrene | 10.7 ⎫ | 19.8% monomers |
| Isobutylene | 15 ⎭ | |
| AlCl₃ | 0.05 | |
| Methyl Chloride | 60 | |
| Hexane | 44 | |
| | 129.75 | |

Residence time in the reactor was about 30 minutes and total conversion was greater than 99%. The polymer analyzed ~ 29 mole % styrene by NMR (~ same as feed composition) and had an interpolated viscosity average molecular weight of about 240,000. Catalyst efficiency realized was about 500 g./g.

Effluent from the reactor was a clear homogeneous cement containing about 19.7% polymer. The polymer was recovered by precipitating in alcohol, then flashing off the solvent and kneading to wash. Two solutions of the copolymer (20 wt. %) were prepared in hexane and toluene. No stratification or phase separation was noted after several weeks of standing.

A film of the copolymer was prepared by casting a layer of the 20% cement on a glass casting tray and allowing it to dry overnight at room temperature. The film was transparent and colorless. (> 95% light transmission in a ¼ inch thick film).

Press pads were prepared by compression molding the copolymer at 300°F. and 1000 psig. for two minutes and then cooling to room temperature under pressure. The pads so formed were transparent and colorless.

EXAMPLE 4

The dried polymer of Example 3 was dissolved in hexane to yield a clear 20.4% cement and then emulsified and stripped using an Alipal CO—433—NaH₂PO₄ emulsifier system to yield a stable 55.8% NVM latex. Alipal CO-433 is the sodium salt of sulfated nonyl phenoxy-poly(ethyleneoxy)-ethanol (28% active). Gum and clay loaded films cast from this latex showed the following properties.

sorption and vapor transmission rate of unloaded films was low.

EXAMPLE 5

A styrene modified butyl rubber was prepared using the process of this invention.

The following four feedstreams were prepared and fed into a well-mixed tank-type reactor maintained at −144°F.

Feedstream No. 1 — 2.8% isoprene in hexane
Feedstream No. 2 — 0.059 g. AlCl₃ per 100 g. methylchloride
Feedstream No. 3 — 16.9% styrene in methylchloride
Feedstream No. 4 — 50.0% isobutylene in hexane Feedstreams No. 1, 3 and 4 were prechilled to −144°F. blended and then fed into the annulus of a well-mixed tank containing a center draft tube and cooling coil. Feedstream No. 2 was prechilled to −82°C. and then fed into the center of the draft tube. Feed rates were adjusted so that the following steady state flows were maintained into the reactor.

| | Flow Rate g./min. | |
|---|---|---|
| Styrene | 6.6 ⎫ | |
| Isoprene | 0.80 ⎬ | 20.6% monomers |
| Isobutylene | 23.4 ⎭ | |
| AlCl₃ | 0.021 | |
| Hexane | 51.3 | |
| Methyl Chloride | 67.5 | |
| | 149.6 | |

The above olefin feedstock composition constituted about 21.4 weight % of styrene, about 2.6 weight % of isoprene, and about 76.0 weight % of isobutylene.

Residence time in the reactor was about 22 minutes and total conversion about 75%. Catalyst efficiency was 1000 g./g. Effluent from the reactor was a clear homogeneous cement containing about 15.5% polymer. The polymer recovered as indicated in Example 3 analyzed about 8 mole % styrene by NMR; had an iodine number of 11.8, and an extrapolated Mv of ~225,000 by Toluene Solution Viscosity (TSV).

Films formed from dried polymer recovered from these runs were clear and homogeneous and maintained clarity and uniformity when stretched. They did not exhibit the detrimental cold flow properties generally associated with butyl rubber.

| Clay Loading, phr | Orig. | Tensile Strength, psi After 5 Day Oven Age at 150°F. | After 185 Hr. Fadeometer Age | Orig. | Elongation % Oven Aged | Fadeometer Aged |
|---|---|---|---|---|---|---|
| 0 | 700 | 835 | 810 | 1260 | 1330 | 1220 |
| 50 | 1160 | 1040 | 1040 | 1240 | 1020 | 1230 |
| 100 | 595 | 520 | 430 | 820 | 640 | 780 |
| 200 | 620 | 760 | 595 | 550 | 230 | 370 |
| 300 | 365 | 530 | 430 | 120 | 60 | 60 |
| 400 | 275 | 470 | 425 | 20 | 20 | 40 |

Good strength properties, adequate for most coatings, and excellent elongation was developed without the need for any vulcanization. Films were tough, non-tacky and showed excellent aging and UV resistance. These properties make this product a desirable polymer for exterior roof coatings and paints. Water ab-

EXAMPLE 6

Copolymers of styrene and isobutylene were prepared in the manner of Example 3 at various wt. % styrene contents and the glass transition temperature determined by differential thermal analysis (DTA).

Figure 4:
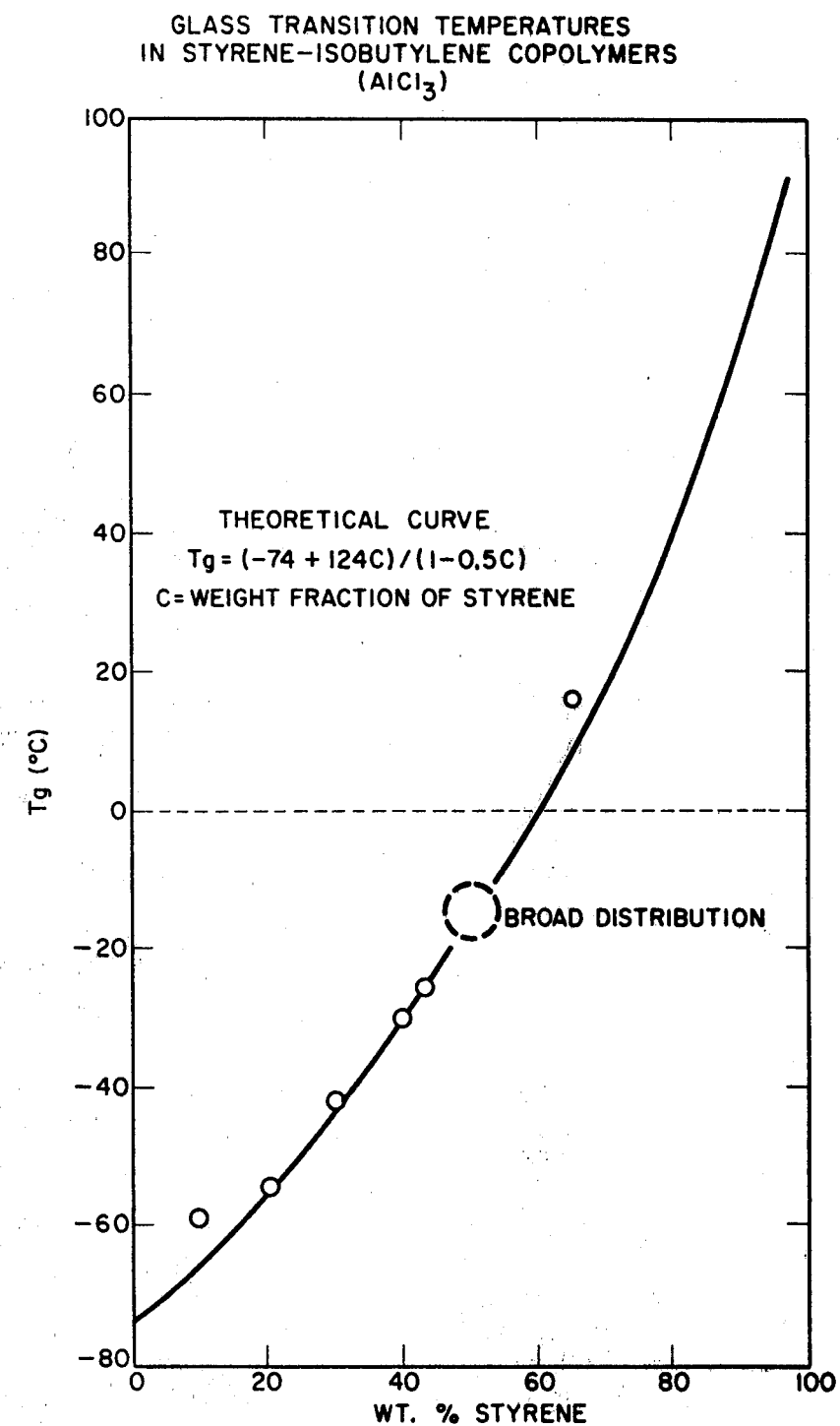

FIG. 4 shows the glass transition temperature as a function of styrene content of a homogeneous styrene isobutylene copolymer.

The copolymers show a single glass-transition temperature indicating a narrow composition range and the absence of homopolymer. The glass transition of these copolymers increases regularly as wt. % styrene in the copolymer increases.

EXAMPLE 7 sition temperature of these copolymers increases regularly as the wt. % styrene in the copolymer increases.

EXAMPLE 8

Various copolymers were prepared in a methylchloridehexane solvent mixture containing 37% methylchloride in the manner of experiment 3. The monomer to catalyst ratio was varied throughout various experiments. The catalyst used was aluminum trichloride. The results are shown in Table III.

TABLE III

| | | | EXPERIMENTAL DATA* | | | | |
|---|---|---|---|---|---|---|---|
| | Feed Composition | | Monomer | | | Avg. Mole % | |
| Run | Styrene | | Catalyst | % | | Styrene In | |
| No. | Mole % | Wt. % | g./g. | Conversion | MWV | Copolymer | Tg, °C. |
| 1 | 5.64 | 10.0 | 1493/1 | 96–99 | 260,000 | 6.8 | −59 |
| 2 | 11.86 | 20.0 | 1300/1 | 98–99 | 140,000 | 12.0 | −54 |
| 3 | 13.8 | 23.0 | 1190/1 | 97–99 | — | — | — |
| 4 | 18.75 | 30.0 | 1250/1 | 94–97 | 120,000 | 18.2 | −41 |
| 5 | 26.41 | 40.0 | 1250/1 | 98–99 | 87,000 | 26.4 | −30 |
| 6 | 30.0 | 43.3 | 1370/1 | 98–99 | 97,000 | 26.7 | −24.5 |
| 7 | 32.50 | 47.0 | 1310/1 | 94–99 | 107,000 | 32.2 | — |
| 9 | 40.0 | 55.3 | 1170/1 | 97–99 | 57,000 | 40.0 | — |
| 10 | 50.0 | 65.0 | 1385/1 | 88–94 | 130,000 | 49.0 | +17 |

*Process conditions:  
Monomer = 15 wt. % of total feed  
Residence Time = 30 min.  
Reactor Temperature — 95°C. ± 5°  
Catalyst — AlCl₃  
Diluent { 63% Hexane / 37% MeCl / 1200 ± 50 }

Styrene-isobutylene polymers were polymerized using prior art methods in methylchloride diluent using AlCl₃ catalyst and either a batch polymerization or a staged, 3 reactor-process in which isobutylene was injected into the second and third reactors along with additional catalyst to progressively increase conversion. These polymers showed a broad composition range in both styrene content and molecular weight.

A 20% solution of these polymers in hexane or toluene stratified into layers within 24 hours, thereby indicating the existence of more than one species of polymer.

Films cast from these solutions were white and nearly opaque (less than 20% light transmission in a ¼ inch thick film) due to the incompatibility of various homopolymers and the broad range of copolymers present. By comparison, similar films of the polymers of this invention exhibit 95% light transmission.

Pads pressed from these polymers were also white and nearly opaque due to the incompatibility of the several polymer species. DTA measurements showed two distinct glass transition temperatures at −74°C. and +100°C. confirming the presence of isobutylene and styrene homopolymers. By comparison, the copolymers of this invention show a single glass-transition temperature indicating a narrow composition range and the absence of any homopolymers. The glass tran- It will be noted that at the monomer to catalyst ratios of about 1000:1 to about 1500:1, the conversion was in the order of about 94 to 99%. The product prepared was high in molecular weight. It is therefore seen in order to obtain high conversions the monomer to catalyst ratio is critical.

EXAMPLE 9

The experiments of Example 8 were repeated using aluminum ethyl dichloride as the catalyst. The results are shown in Table IV.

TABLE IV

| | EXPERIMENTAL DATA⁽¹⁾ | | | | | |
|---|---|---|---|---|---|---|
| | Feed Composition | | | | Mole % | |
| Run | Styrene | | Catalyst | Conver- | Styrene | |
| No. | Mole % | Wt. % | g./g. | sion, % | In Copolymer | MW |
| 1 | 11.86 | 20 | 960/1 | 98–99 | 12.0 | 250,000 |
| 2 | 35 | 50 | 800/1 | 98–99 | 35.0 | 160,000 |
| 3 | 50 | 65 | 604/1 | 96–99 | 49.5 | 60,000 |

⁽¹⁾Catalyst — EtAlCl₂

It will be noted that in the monomer to catalyst ratios of 600:1 to 1000:1, conversion ratio was in excess of 95%.

Since many different embodiments of this invention may be made without departing from the spirit and scope thereof, it is to be understood that the present invention is not limited to the embodiments specifically disclosed in this specification thereof.

I claim:

1. A process for preparing a substantially homogeneous random terpolymer, wherein said homogeneous random terpolymer has a single glass transition temperature as determined by differential thermal analysis, which comprises continuously terpolymerizing a feed compositon of between about 0.5 and about 30.0 wt. % styrene, between about 0.5 and about 30.0 wt. % of a conjugated multi-olefin monomer, the remainder of the feed composition being an isoolefinic monomer, utilizing a Friedel-Crafts catalyst, in a well stirred reactor, said reaction being carried out in a solvent for the resulting terpolymer, said solvent comprising a mixture of about 20 to about 80 volume % of at least one polar nonaromatic organic solvent and about 80 to about 20 volume % of at least one nonaromatic nonpolar hydrocarbon solvent, based on the solvent mixture; the ratio of polar to nonpolar solvents being so selected that the ratio of the reactivity ratio of styrene to the reactivity ratio of the isoolefin monomer is maintained at about 0.4 to about 3.0.

2. The process of claim 1 wherein the Friedel-Crafts catalyst is selected from the group consisting of aluminum trichloride, aluminum ethyl dichloride, aluminum tribromide, boron trifluoride, isobutyl aluminum dichloride, titanium tetrachloride and mixtures thereof.

3. The process of claim 1 wherein the isoolefinic monomer is isobutylene.

4. The process of claim 3 wherein the catalyst is aluminum trichloride and the monomer to catalyst ratio is about 1000:1 to about 1500:1.

5. The process of claim 3 wherein the catalyst is aluminum ethyl dichloride and the ratio of monomer to catalyst is about 600:1 to about 1000:1.

6. The process of claim 1 wherein the polar nonaromatic organic solvent is selected from the group consisting of methyl chloride, ethyl chloride, methylene chloride, carbon disulfide, ethyl bromide and mixtures thereof.

7. The process of claim 1 wherein the nonaromatic nonpolar hydrocarbon solvent is selected from the group consisting of pentane, hexane, methylcyclopentane, 2- methyl pentane, and 2,3-dimethyl butane.

8. The process of claim 1 wherein the reaction is carried out at a temperature of about $-30°$ to about $-100°C$.

9. The process of claim 8 wherein the reaction is carried out at about $-40°$ to about $-97°C$.

10. The process of claim 1 wherein said conjugated multiolefin monomer is isoprene or butadiene.

11. The process of claim 10 wherein the conjugated multiolefin monomer is isoprene.

* * * * *